United States Patent
Zhang et al.

(10) Patent No.: US 11,888,284 B2
(45) Date of Patent: Jan. 30, 2024

(54) SATURABLE ABSORBER MIRROR OF COMPOSITE STRUCTURE

(71) Applicant: QINGDAO YICHENLEISHUO TECHNOLOGY CO., LTD, Qingdao (CN)

(72) Inventors: Ziyang Zhang, Suzhou (CN); Qinglu Liu, Suzhou (CN)

(73) Assignee: QINGDAO YICHENLEISHUO TECHNOLOGY CO., LTD, Qingdao (CN)

(*) Notice: Subject to any disclaimer, the term of this patent is extended or adjusted under 35 U.S.C. 154(b) by 1310 days.

(21) Appl. No.: 16/346,084

(22) PCT Filed: Dec. 27, 2016

(86) PCT No.: PCT/CN2016/112234
§ 371 (c)(1),
(2) Date: Apr. 29, 2019

(87) PCT Pub. No.: WO2018/076522
PCT Pub. Date: May 3, 2018

(65) Prior Publication Data
US 2019/0271899 A1    Sep. 5, 2019

(30) Foreign Application Priority Data

Oct. 31, 2016  (CN) .......................... 201610931340.5

(51) Int. Cl.
*H01S 3/113*     (2006.01)
*H01S 3/1118*    (2023.01)
(Continued)

(52) U.S. Cl.
CPC ............. *H01S 3/1118* (2013.01); *H01S 3/113* (2013.01); *H01S 3/1112* (2013.01);
(Continued)

(58) Field of Classification Search
CPC .... H01S 3/1118; H01S 3/1112; H01S 3/1115; H01S 3/113; H01S 3/1106
See application file for complete search history.

(56) References Cited

U.S. PATENT DOCUMENTS 5,461,637 A * 10/1995 Mooradian ............. H01S 5/041
  372/18
2001/0048706 A1* 12/2001 Deichsel ............... H01S 3/1118
  372/107

(Continued)

FOREIGN PATENT DOCUMENTS

CN      1705174 A     12/2005
CN      1707882 A     12/2005
(Continued)

*Primary Examiner* — Kinam Park
(74) *Attorney, Agent, or Firm* — Maschoff Brennan (57) ABSTRACT

The present disclosure discloses a saturable absorber mirror of a composite structure, including: a substrate; a buffer layer on the substrate; a distributed Bragg reflective mirror on the buffer layer; a quantum dot or quantum well saturable absorber body on the distributed Bragg reflective mirror; a graphene saturable absorber body on the quantum dot or quantum well saturable absorber body. In the present disclosure, the graphene saturable absorber body is composited with the quantum dot saturable absorber body or the quantum well saturable absorber body to be used as the saturable absorber body in the saturable absorber mirror of the present disclosure. A thermal damage threshold and an optical property stability of the saturable absorber body are improved, and an ultrafast laser pulse with high power and short pulse mode locking, a stable output repetition cycle, a narrow pulse width, and a short response time is implemented.

18 Claims, 4 Drawing Sheets

(51) Int. Cl.
*H01S 3/1115* (2023.01)
*H01S 3/1112* (2023.01)
*G02B 5/08* (2006.01)
*G02F 1/35* (2006.01)
*H01S 3/1106* (2023.01)

(52) U.S. Cl.
CPC .......... *H01S 3/1115* (2013.01); *G02B 5/0841* (2013.01); *G02F 1/3523* (2013.01); *G02F 2201/346* (2013.01); *G02F 2202/108* (2013.01); *H01S 3/1106* (2013.01)

(56) References Cited

U.S. PATENT DOCUMENTS

| | | | | |
|---|---|---|---|---|
| 2009/0052479 | A1* | 2/2009 | Salokatve | H01S 3/1118 372/18 |
| 2009/0296767 | A1* | 12/2009 | Okhotnikov | B82Y 20/00 372/45.013 |
| 2012/0026504 | A1* | 2/2012 | Yamada | H01S 3/10084 372/20 |
| 2013/0188664 | A1* | 7/2013 | Xie | G02F 1/3523 359/884 |
| 2014/0285796 | A1* | 9/2014 | Yager | G01N 21/8422 356/237.1 |

FOREIGN PATENT DOCUMENTS

| | | |
|---|---|---|
| CN | 102545022 A | 7/2012 |
| CN | 102769249 A | 11/2012 |
| CN | 103247935 A | 8/2013 |
| CN | 104158079 A | 11/2014 |

\* cited by examiner

SATURABLE ABSORBER MIRROR OF COMPOSITE STRUCTURE

TECHNICAL FIELD

The present disclosure relates to a saturable absorber mirror, and in particular, relates to a saturable absorber mirror of a composite structure.

BACKGROUND ART

A semiconductor saturable absorber mirror, i.e., SESAM, has become a crucial component in an ultrafast laser, at present. A major cause of applying a SESAM lies in that it may not be affected by a cavity-shape design of a resonance cavity, and optical characteristics like linearity and non-linearity thereof may be controlled within a relatively broad range such that the application of it within a specific resonance cavity has more freedom. In addition, since instability of Q modulation may be better suppressed by its large absorption cross section and low saturation flux generated due to the large absorption cross section, the SESAM is an ideal device for passive mode-locking of a solid-state laser. Early in 1990s, not only theoretical computation but also experimental results indicate that a passive mode-locking diode pumped laser may not always work in a continuous wave mode, and emitted pulse laser is always Q modulated, thereby limiting the application and development of the SESAM greatly. A first SESAM-antiresonance Fabry-Perot saturable absorber body that may implement continuous mode-locking appears in 1992. From then on, people start to carry out a research on a theory aspect of a SESAM used as a passive mode-locking element of a solid-state laser to aim to establish theoretical foundation for designing a SESAM practically applied to a laser system. Under the guidance of theoretical research of the SESAM, people make some critical performances of a ultrafast laser obtain unprecedented improvements, such as further compressing a pulse width, and increasing a maximum average power, a peak value power and a repetition frequency of a passive mode-locking laser. Currently, a semiconductor saturable absorber body that is generally applied is mainly made of a material of a semiconductor quantum dot or quantum well structure.

Chinese invention patent application CN200410047946.X discloses a semiconductor saturable absorber mirror with a high reflective surface, the semiconductor saturable absorber mirror including, from the bottom to the top, a substrate, a buffer layer, a Bragg reflective mirror, a quantum well, and a high reflective film. A saturable absorber body of a quantum dot or quantum well structure has ultrafast carrier dynamics to stabilize mode locking, and its ultra-wide gain and absorber line may better narrow a pulse. In addition, unique physical properties of a quantum dot or quantum well saturable absorber body may further make it have characteristics of low saturable flux, continuously adjustable work wavelength, a stable temperature etc. However, in the practical application, due to mismatched stresses generated by various strain and lattice mismatches and existence of defects such as point defects and line defects in a structure, it is difficult to a quantum dot and a quantum well to implement multi-cycle repetition growth, and a mode locking effect thereof generally cannot reach an ideal value. Moreover, due to existence of thermal damage effect, an output power of laser cannot be enhanced greatly.

SUMMARY OF INVENTION

In order to resolve the above problems, the present disclosure provides a saturable absorber mirror of a composite structure, wherein a saturable absorber body of a composite structure is included, which may increase a thermal damage threshold and optical property stability of the saturable absorber body, realize high power and short pulse mode locking, and output an ultrafast laser pulse with a stable repetition cycle, a narrow pulse width, and a short response time.

In order to achieve the above purposes, the present disclosure adopts a following technical solution:

A saturable absorber mirror of a composite structure includes: a substrate; a buffer layer on the substrate; a distributed Bragg reflective mirror on the buffer layer; a quantum dot or quantum well saturable absorber body on the distributed Bragg reflective mirror; a graphene saturable absorber body on the quantum dot or quantum well saturable absorber body.

The quantum dot saturable absorber body includes at least one quantum dot structure disposed in cyclic lamination, and the quantum dot structure includes a lower limiting layer, a quantum dot layer, an upper limiting layer and a first spacer layer that are sequentially laminated in a direction away from the distributed Bragg reflective mirror.

The number of cycles of the quantum dot structure included by the quantum dot saturable absorber body is 1 to 50.

The quantum well saturable absorber body includes at least one single quantum well structure disposed in cyclic lamination, and the single quantum well structure includes a lower barrier layer, a quantum well layer, an upper barrier layer and a second spacer layer that are sequentially laminated in a direction away from the distributed Bragg reflective mirror.

The number of cycles of the single quantum well structure included by the quantum well saturable absorber body is 1 to 50.

The graphene saturable absorber body includes a support substrate layers and a graphene layers that are sequentially, cyclically and alternatively laminated in a direction away from the quantum dot saturable absorber body or the quantum well saturable absorber body.

The graphene saturable absorber body includes the support substrate layers and the graphene layers that are cyclically and alternatively laminated, and the number of cyclic laminations is 1 to 30.

The distributed Bragg reflective mirror includes two kinds of dielectric film materials of 20 to 60 cycles that are cyclically and alternatively laminated.

The saturable absorber body further includes a high reflective film, and the high reflective film is on the graphene saturable absorber body; and the high reflective film includes two kinds of dielectric film materials of 1 to 10 cycles that are cyclically and alternatively laminated.

A thickness of the buffer layer is 200 nm to 500 nm.

In comparison with the prior art, the saturable absorber mirror of the composite structure provided by the present disclosure has the following advantages: the graphene saturable absorber body is composited with the quantum dot saturable absorber body or the quantum well saturable absorber body to be used as the saturable absorber body in the saturable absorber mirror of the present disclosure; a characteristic of non-linear saturable absorption of the graphene is used to realize double mode locking of the saturable absorber body and increase a modulation depth of the saturable absorber body while reducing a repeated growth cycles of the quantum dot or quantum well correspondingly; the graphene has a characteristic of high thermal damage threshold such that the saturable absorber body having the composite structure of the present disclosure may bear the higher incident laser power, thereby increasing an output power of a laser pulse; since a saturation relaxation time of the graphene is very short, it is benefit for the generation of the ultrafast pulse. In conclusion, adopting the saturable absorber mirror having the composite structure of the present disclosure may obtain the desired ultrafast laser pulse output with a stable repetition cycle, a narrow pulse and a short response time.

BRIEF DESCRIPTION OF THE DRAWINGS

The present disclosure will be further explained below in detail in conjunction with the accompanying drawings and the exemplary embodiments.

DETAILED DESCRIPTION OF THE EXEMPLARY EMBODIMENTS

In order for the purpose, technical solution and advantages of the present disclosure to be clearer, the exemplary embodiments of the present disclosure will be explained in details below in conjunction with the drawings. The examples of the preferred embodiments are exemplified in the drawings. The embodiments of the present disclosure as shown in the drawings and as described according to the drawings are only exemplified, and the present disclosure is not limited to these embodiments.

Here, it is also worthy to explain that, in order to prevent the present disclosure from being obscured due to unnecessary details, the drawings only illustrate the structure and/or processing steps closely related to the solution based on the present disclosure, while other details less related to the present disclosure are omitted.

Embodiment 1

Figure 1:
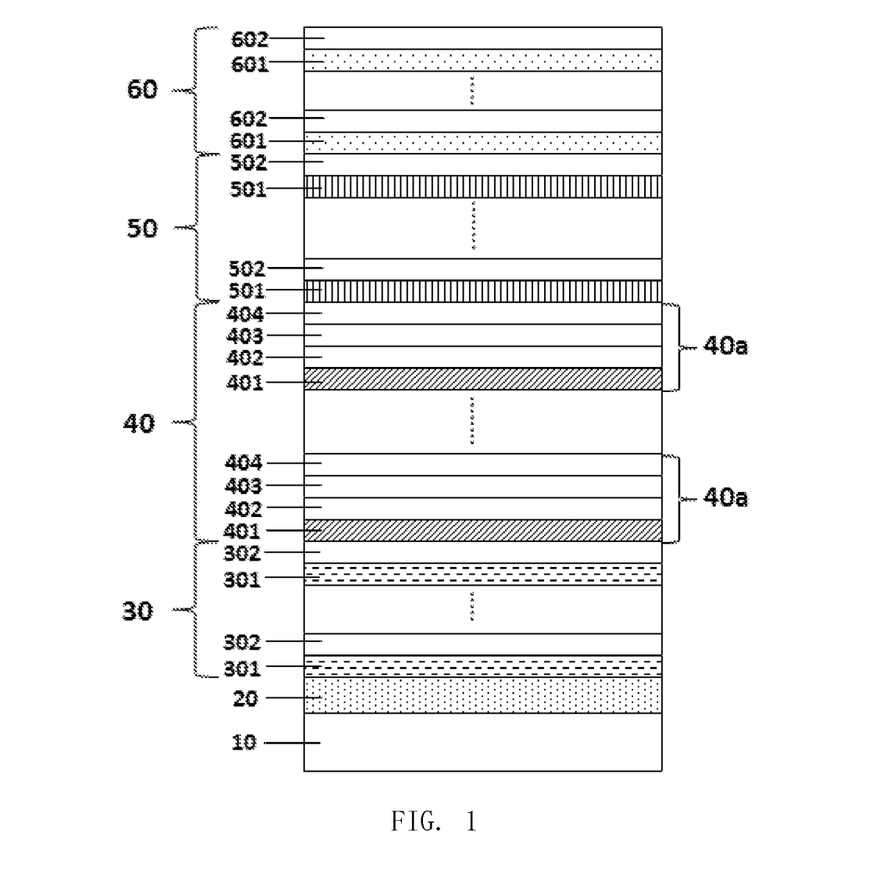
FIG. 1 is a structural schematic diagram illustrating a saturable absorber mirror according to Embodiment 1 of the present disclosure.

The present embodiment provides a saturable absorber mirror of a composite structure of a graphene and a quantum dot. As shown in FIG. 1, a structure of the saturable absorber mirror of the composite structure of the graphene and the quantum dot includes, sequentially from the bottom to the top, a substrate 10, a buffer layer 20, a distributed Bragg reflective mirror 30, a quantum dot saturable absorber body 40, a graphene saturable absorber body 50 and a high reflective film 60.

In the present embodiment, the substrate 10 adopts a semiconductor chip for providing support to the entire saturable absorber mirror, and the semiconductor chip may be GaAs, InP, GaSb or other semiconductor chips. The buffer layer 20 is manufactured by epitaxially growing a semiconductor material having a lattice constant close to those of materials of the substrate 10 and the distributed Bragg reflective mirror 30, and in order to make a surface of the substrate 10 more flat and provide transition to the following distributed Bragg reflective mirror 30, the material of the buffer layer 20 in the present embodiment adopts GaAs. Certainly, in another embodiment, the substrate 10 and the buffer layer 20 may be selected as some other materials that are generally used in the art, and a thickness of the buffer layer 20 may be selected to be 200 nm to 500 nm.

The distributed Bragg reflective mirror 30 includes two kinds of dielectric materials 301 and 302 having refractive indices greatly different from each other that are cyclically and alternatively laminated, and the number of cycles of the alternative laminations may be selected to be 20 to 60. Furthermore, in order to strengthen reflectivity, thicknesses of the dielectric materials 301 and 302 both are a quarter wavelength, that is, $d=\lambda/4n$, where d is a thickness of the dielectric layer, $\lambda$ is a work wavelength, and n is a dielectric reflective index. In the present embodiment, the dielectric material 301 adopts GaAs, and the dielectric material 302 adopts AlGaAs. In other embodiments, according to different requirements for the work wavelength and modulation, combinations of the two kinds of dielectric materials 301 and 302 may also be GaAs/AlGaAs, InP/InGaP, InGaP/InGaAsP, GaAs/AlAs and the like.

The quantum dot saturable absorber body 40 includes at least one quantum dot structure 40a disposed in cyclic lamination, and the quantum dot structure 40a includes a lower limiting layer 401, a quantum dot layer 402, an upper limiting layer 403 and a first spacer layer 404 that are sequentially laminated in a direction away from the distributed Bragg reflective mirror 30. A thickness of the lower limiting layer 401 is within a selectable range of less than 2 nm, a thickness of the upper limiting layer 403 may be selected to be less than 10 nm, and a thickness of the first spacer layer 404 is within a selectable range of 10 nm to 50 nm. In the present embodiment, the lower limiting layer 401 selects to use a material of InAlGaAs, and the quantum dot layer 402 generally adopts a semiconductor alloy material. In the present embodiment, a material of $In_{1-x}Ga_xAs$ is selected to be used, wherein 0<x<1. A size and composition of the quantum dot layer 402 are obtained by determining a band gap according to the desired work wavelength, and inferring according to a band gap value and a relational expression between a solid solution ratio and the size. The upper limiting layer 403 selects to use a material of InAlGaAs, and the first spacer layer 404 selects to use a material of GaAs.

The graphene saturable absorber body 50 includes support substrate layers 501 and graphene layers 502 that grow cyclically and are alternatively and sequentially laminated in a direction away from the quantum dot saturable absorber body 40. A position and the number of layers of the graphene layers 502 are determined by the desired work wavelength and the modulation depth. In the present embodiment, a repetition growth cycles of the support substrate layers 501 and the graphene layers 502 may be selected to be 1 to 30, and the support substrate layer 501 may be a material of GaAs. A position of the graphene is selected according to intensity distribution of an internal electric field. When the graphene is located at a wave peak of an internal field intensity, an absorption capability is the strongest, and the modulation depth may also increase correspondingly. In addition, a modulation capability of the graphene may reduce as the number of layers increases. That is to say, the position and the number of layers of the graphene are determined by the desired work wavelength and the modulation depth.

The high reflective film 60 includes two kinds of dielectric materials 601 and 602 having high refractive indices that are cyclically and alternatively laminated, and the number of cycles of the alternative lamination may be selected to be 1 to 10. A combination of the two kinds of dielectric materials selects to use $SiO_2/Ti_2O_5$. It needs to explain that the saturable absorber mirror of the composite structure may not be provided with the high reflective film 60 in some other embodiments. In addition, the high reflective film 60 may be two kinds of III-V semiconductor materials or precious metal materials that are cyclically alternated.

In the saturable absorber mirror provided by the present embodiment, the graphene saturable absorber body is composited with the quantum dot saturable absorber body to be used as the saturable absorber body in the saturable absorber mirror; a characteristic of non-linear saturable absorption of the graphene is used to realize double mode locking of the saturable absorber body and increase a modulation depth of the saturable absorber body while reducing repeated growth cycles of the quantum dot structure correspondingly.

Embodiment 2

Figure 2:
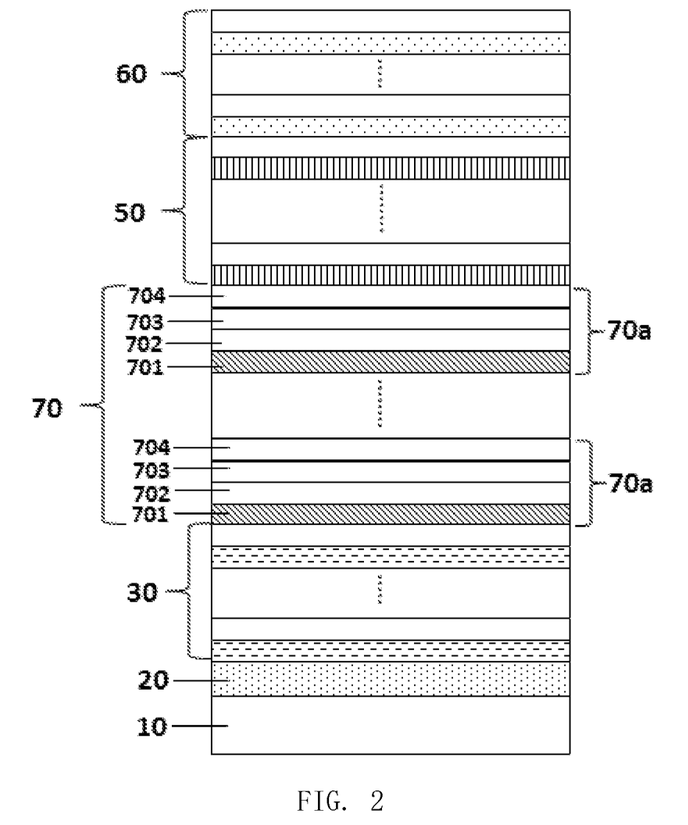
FIG. 2 is a structural schematic diagram illustrating a saturable absorber mirror according to Embodiment 2 of the present disclosure.

The present embodiment provides a saturable absorber mirror of a composite structure of a graphene and a quantum well. As shown in FIG. 2, a structure of the saturable absorber mirror of the composite structure of the graphene and the quantum well includes, sequentially from the bottom to the top, a substrate 10, a buffer layer 20, a distributed Bragg reflective mirror 30, a quantum well saturable absorber body 70, a graphene saturable absorber body 50 and a high reflective film 60. Structures and materials of the substrate 10, the buffer layer 20, the distributed Bragg reflective mirror 30, the graphene saturable absorber body 50 and the high reflective film 60 may be implemented by referring to the technical solution of Embodiment 1, which are not repeated here again. Different from embodiment 1, the present embodiment adopts the quantum well saturable absorber body 70 to replace the quantum dot saturable absorber body 40 in Embodiment 1.

In particular, the quantum well saturable absorber body 70 includes at least one single quantum well structure 70a disposed in cyclic lamination, and the single quantum well structure 70a includes a lower barrier layer 701, a quantum well layer 702, an upper barrier layer 703 and a second spacer layer 704 that are sequentially laminated in a direction away from the distributed Bragg reflective mirror 30. A thickness of the lower barrier layer 701 may be selected to be less than 30 nm, a thickness of the upper barrier layer 703 may be selected to be less than 30 nm, and a thickness of the second spacer layer 704 may be selected to be 10 nm to 50 nm. In the present embodiment, the lower barrier layer 701 selects to use a material of $GaN_xAs_{1-x}$, where $0<x<1$, the quantum well layer 702 selects to use a material of GaInNAs, the upper barrier layer 703 selects to use a material of GaNAs, and the second spacer layer 704 selects to use a material of GaAs.

In the saturable absorber mirror provided by the present embodiment, the graphene saturable absorber body is composited with the quantum well saturable absorber body to be used as the saturable absorber body in the saturable absorber mirror; a characteristic of non-linear saturable absorption of the graphene is used to realize double mode locking of the saturable absorber body and increase a modulation depth of the saturable absorber body while reducing repeated growth cycles of the quantum well structure correspondingly.

Figure 3:
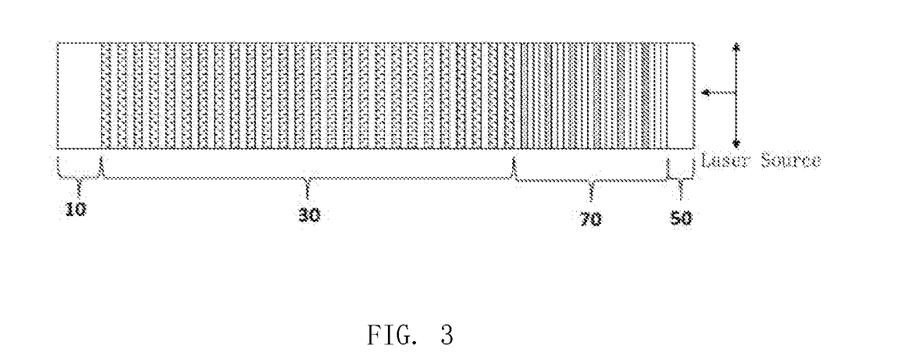
FIG. 3 is an optical simulation model of a saturable absorber mirror at a wave band of 1550 nm according to Embodiment 2 of the present disclosure.
Figure 4:
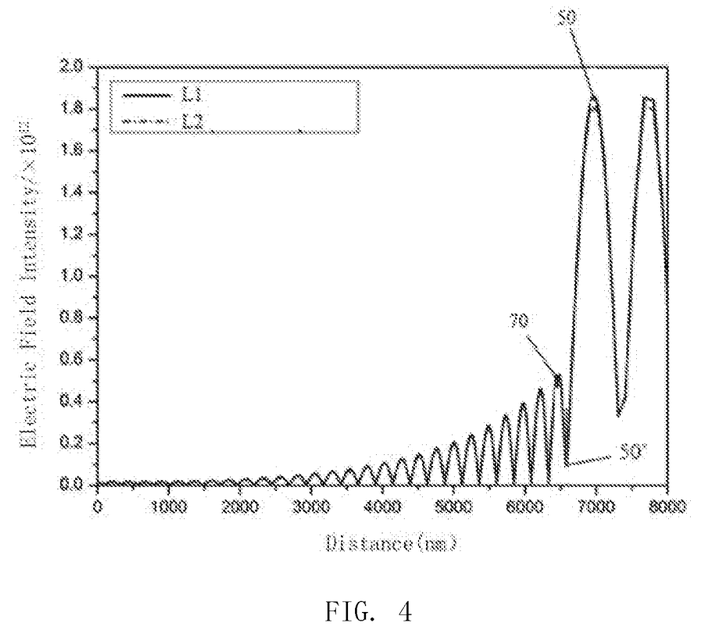
FIG. 4 is a schematic diagram illustrating distribution of an optical simulation electric field of a saturable absorber mirror at a wave band of 1550 nm according to Embodiment 2 of the present disclosure.
Figure 5:
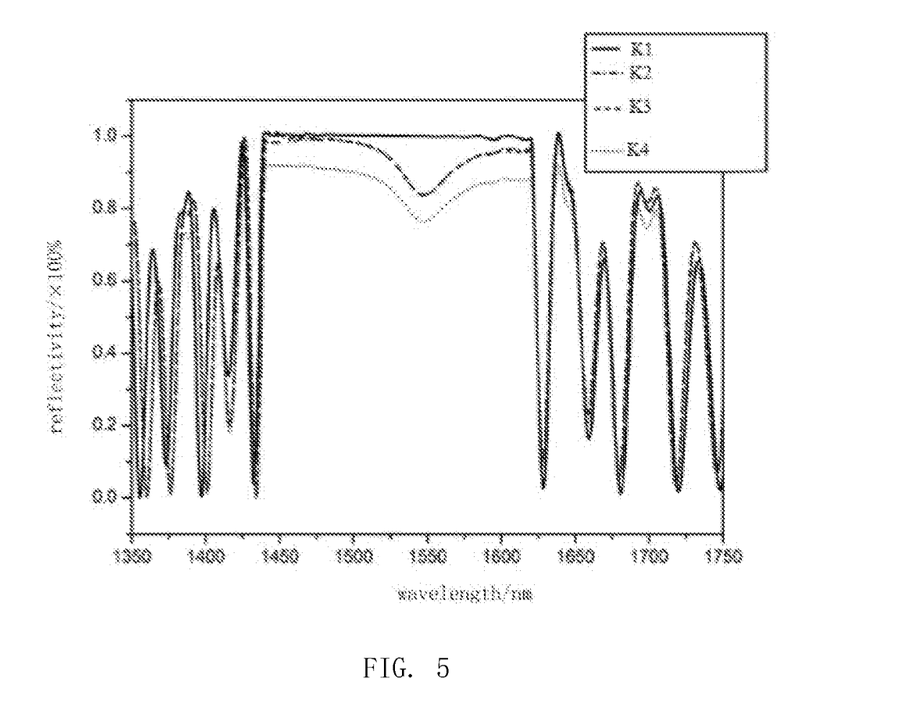
FIG. 5 is an optical simulation reflection spectrum of a saturable absorber mirror at a wave band of 1550 nm according to Embodiment 2 of the present disclosure.

FIGS. 3 to 5 illustrate analog simulation performed on an optical reflection spectrum and internal light field intensity of the saturable absorber mirror of the composite structure of the graphene and the quantum well at a wave band of 1550 nm by the present disclosure using a time-domain difference finite-difference optical simulation method.

FIG. 3 illustrates an optical simulation model of the saturable absorber mirror of the composite structure of the graphene and the quantum well at the wave band of 1550 nm. The model is constructed completely in accordance with a size of the saturable absorber mirror of the composite structure of the graphene and the quantum well in the present disclosure, wherein the cycles of the lamination of the distributed Bragg reflective mirror 30 are totally 26, the cycles of the lamination of the quantum well saturable absorber body 70 are 6, and the cycle of the lamination of the graphene saturable absorber body 50 is 1. Referring to the figures, it can be seen that a laser source, the graphene saturable absorber body 50, the quantum well saturable absorber body 70, the distributed Bragg reflective mirror 30 and the substrate 10 are sequentially arranged from the right to the left.

FIG. 4 illustrates a distribution spectrogram of an optical simulation electric field of the saturable absorber mirror of the composite structure of the graphene and the quantum well at the wave band of 1550 nm. According to current experimental reports related to the structure of the quantum well saturable absorber mirror, it is explicitly pointed out that an absorption capability is strongest when the quantum well saturable absorber body 70 is located at a wave peak of an internal electric field. FIG. 4 illustrates changes of an intensity of the internal electric field of the saturable absorber mirror model depend on the increased distance in a direction from the substrate 10 to the high reflective film 60, thereby determining corresponding positions of the quantum well saturable absorber body 70 and the graphene saturable absorber body 50 of the saturable absorber mirror model in the electric field. As shown in FIG. 4, a curved line L1 corresponds to both of the quantum well saturable absorber body 70 and the graphene saturable absorber body 50 being located at the wave peaks of the internal electric field, and a curved line L2 corresponds to the quantum well saturable absorber body 70 being located at the wave peak of the internal electric field and the graphene saturable absorber body 50 being located at a wave valley of the internal electric field. In FIG. 4, the curved line L1 almost completely overlaps the curved line L2, and a difference thereof lies in the wave peaks near 7000 nm and 7800 nm, and an intensity of the electric field corresponding to the curved line L1 is slightly greater than an intensity of the electric field corresponding to the curved line L2.

FIG. 5 illustrates a reflection spectrum of an optical simulation of the saturable absorber mirror of the composite structure of the graphene and the quantum well at the wave band of 1550 nm. In the figure, a curved line K1 represents a reflection spectrum of the distributed Bragg reflective mirror 30, it can be known that a reflection capability of the distributed Bragg reflective mirror 30 approximates to 100% when it is near to the wave band of 1550 nm, and this result proves that the distributed Bragg reflective mirror 30 may achieve a high reflectivity that satisfies an experimental requirement. A curved line K2 represents a reflection spectrum of the quantum well saturable absorber body 70 at the wave peak of the internal electric field. It can be known from the cured line K2 that the structure may absorb 10 to 15% of light of the wave band of 1550 nm. Thus, it is explained that the quantum well saturable absorber body 70 in the structure of the present disclosure may absorb the light of the wave band of 1550 nm indeed, and it further proves that the design of the structure of the quantum well saturable absorber body 70 in the present disclosure is also effective and reasonable. A curved line K3 represents a reflection spectrum in which the quantum well saturable absorber body 70 being located at the wave peak of the internal electric field and the graphene saturable absorber body 50 being located at the wave valley of the internal field intensity. As shown in FIG. 5, the curved line K3 almost overlaps the curved line K2, that is, the graphene saturable absorber body 50 almost does not absorb light when it is located at the wave valley of the internal field intensity. This also sufficiently verifies the theory pointed out in experiments, that is, the saturable absorber body almost does not absorb light when it is located at the wave valley of the internal field intensity. A curved line K4 represents a reflection spectrum in which both of the quantum well saturable absorber body 70 and the graphene saturable absorber body 50 are located at the wave peaks of the internal electric field. It can be known from the curved line K4 that an absorption capability for light is obviously better than an absorption capability of the structure in which only the quantum well saturable absorber body is disposed, and the structure may absorb about 20% of light of the wave band of 1550 nm. Thus, it proves that the saturable absorber mirror of the composite structure of the graphene and the quantum well may implement the corresponding double mode locking function indeed.

It needs to explain that the above analog simulations are performed in an ideal state without considering factors such as loss, strain, defects and so on. In the practical operation, due to existence of various influencing factors and parameters being set to be not completely the same, obtained results may be not completely identical to the obtained results of the present embodiment. However, this will not affect the analog simulation experiments verifying that the structure of the saturable absorber mirror of the composite structure of the graphene and the quantum well in the present embodiment is able to implement the corresponding double mode locking function indeed. Moreover, by adopting the saturable absorber mirror of the composite structure of the present disclosure, it is definite that an improvement in a mode locking effect of a saturable absorber body may be obtained, and the technical effects such as the desired ultrafast laser pulse output with a stable repetition cycle, a narrow pulse and a short response time and the like may be obtained, that's for sure.

In conclusion, in the saturable absorber mirror provided by the present disclosure, the graphene saturable absorber body is composited with the quantum dot saturable absorber body or the quantum well saturable absorber body to be used as the saturable absorber body in the saturable absorber mirror of the present disclosure. A thermal damage threshold and an optical property stability of the saturable absorber body are improved, and a high power and short pulse mode locking is implemented, and an ultrafast laser pulse with a stable output repetition cycle, a narrow pulse width, and a short response time is output.

In addition, the relationship terms, such as first and second, etc., in the present text are only used for distinguishing one entity or operation from another entity or operation without necessarily requiring or implying any actual relation or sequence existing between these entities or operations. Moreover, the term "include", "contain" or any other variant means covering instead of exclusively including, so that the process, method, object or device including a series of factors not only includes those factors but also includes other factors that are not explicitly listed or further include inherent factors for this process, method, object or device. Where no more limitations are provided, the factors defined by the sentence "include one . . . " do not exclude additional identical factors existing in the process, method, object or device which includes the factors.

The above statements are only the specific embodiments of the present disclosure, it should be pointed out that, to those ordinarily skilled in the art, several improvements and transform can be made without breaking away from the principle of the present disclosure, also those improvements and transform should be considered as the protection scope of the present application.

What is claimed is:

1. A saturable absorber mirror of a composite structure, comprising:
   a substrate;
   a buffer layer on the substrate;
   a distributed Bragg reflective mirror on the buffer layer;
   a quantum dot or quantum well saturable absorber body on the distributed Bragg reflective mirror; and
   a graphene saturable absorber body composited with the quantum dot or quantum well saturable absorber body to realize double mode locking of the graphene saturable absorber body and the quantum dot or quantum well saturable absorber body.

2. The saturable absorber mirror of claim 1, wherein the quantum dot saturable absorber body comprises at least one quantum dot structure disposed in cyclic lamination, the quantum dot structure comprising a lower limiting layer, a quantum dot layer, an upper limiting layer and a first spacer layer that are sequentially laminated in a direction away from the distributed Bragg reflective mirror.

3. The saturable absorber mirror of claim 2, wherein a number of cycles of the quantum dot structure comprised by the quantum dot saturable absorber body is 1 to 50.

4. The saturable absorber mirror of claim 1, wherein the quantum well saturable absorber body comprises at least one single quantum well structure disposed in cyclic lamination, the single quantum well structure comprising a lower barrier layer, a quantum well layer, an upper barrier layer and a second spacer layer that are sequentially laminated in a direction away from the distributed Bragg reflective mirror.

5. The saturable absorber mirror of claim 4, wherein a number of cycles of the single quantum well structure comprised by the quantum well saturable absorber body is 1 to 50.

6. The saturable absorber mirror of claim 1, wherein the graphene saturable absorber body comprises a support substrate layers and graphene layers that are sequentially, cyclically and alternatively laminated in a direction away from the quantum dot saturable absorber body or the quantum well saturable absorber body.

7. The saturable absorber mirror of claim 6, wherein the graphene saturable absorber body comprises the support substrate layers and the graphene layers that are cyclically and alternatively laminated, and a number of cyclic laminations is 1 to 30.

8. The saturable absorber mirror of claim 1, wherein the distributed Bragg reflective mirror comprises two kinds of dielectric film materials of 20 to 60 cycles that are cyclically and alternatively laminated.

9. The saturable absorber mirror of claim 1, wherein the saturable absorber body further includes a high reflective film, the high reflective film being on the graphene saturable absorber body; and the high reflective film comprises two kinds of dielectric film materials of 1 to 10 cycles that are cyclically and alternatively laminated.

10. The saturable absorber mirror of claim 1, wherein a thickness of the buffer layer is 200 nm to 500 nm.

11. The saturable absorber mirror of claim 2, wherein the graphene saturable absorber body comprises a support substrate layers and graphene layers that are sequentially, cyclically and alternatively laminated in a direction away from the quantum dot saturable absorber body or the quantum well saturable absorber body.

12. The saturable absorber mirror of claim 11, wherein the graphene saturable absorber body comprises the support substrate layers and the graphene layers that are cyclically and alternatively laminated, and a number of cyclic laminations is 1 to 30.

13. The saturable absorber mirror of claim 3, wherein the graphene saturable absorber body comprises a support substrate layers and graphene layers that are sequentially, cyclically and alternatively laminated in a direction away from the quantum dot saturable absorber body or the quantum well saturable absorber body.

14. The saturable absorber mirror of claim 13, wherein the graphene saturable absorber body comprises the support substrate layers and the graphene layers that are cyclically and alternatively laminated, and a number of cyclic laminations is 1 to 30.

15. The saturable absorber mirror of claim 4, wherein the graphene saturable absorber body comprises a support substrate layers and graphene layers that are sequentially, cyclically and alternatively laminated in a direction away from the quantum dot saturable absorber body or the quantum well saturable absorber body.

16. The saturable absorber mirror of claim 15, wherein the graphene saturable absorber body comprises the support substrate layers and the graphene layers that are cyclically and alternatively laminated, and a number of cyclic laminations is 1 to 30.

17. The saturable absorber mirror of claim 5, wherein the graphene saturable absorber body comprises a support substrate layers and graphene layers that are sequentially, cyclically and alternatively laminated in a direction away from the quantum dot saturable absorber body or the quantum well saturable absorber body.

18. The saturable absorber mirror of claim 17, wherein the graphene saturable absorber body comprises the support substrate layers and the graphene layers that are cyclically and alternatively laminated, and a number of cyclic laminations is 1 to 30.

* * * * *